United States Patent [19]

Hatton

[11] Patent Number: 5,062,611
[45] Date of Patent: Nov. 5, 1991

[54] SERVO OPERATED VALVE ASSEMBLY

[75] Inventor: Bruce M. Hatton, Carol Stream, Ill.

[73] Assignee: Eaton Corporation, Cleveland, Ohio

[21] Appl. No.: 560,929

[22] Filed: Jul. 31, 1990

[51] Int. Cl.⁵ ........................ F16K 31/04; F16K 51/00
[52] U.S. Cl. ................................. 251/129.11; 251/284
[58] Field of Search ........... 251/129.01, 129.2, 129.11, 251/129.12, 129.13, 284; 318/439, 469, 474

[56] References Cited

U.S. PATENT DOCUMENTS

| | | | |
|---|---|---|---|
| 4,220,900 | 9/1980 | Mintz | 318/469 X |
| 4,645,042 | 2/1987 | Inoue et al. | 251/129.12 X |
| 4,678,975 | 7/1987 | Vrabel et al. | 318/469 X |
| 4,844,110 | 7/1989 | Paley | 251/129.12 X |

FOREIGN PATENT DOCUMENTS

83/02692 8/1983 World Int. Prop. O. ...... 251/129.13

Primary Examiner—John Rivell
Attorney, Agent, or Firm—R. A. Johnston

[57] ABSTRACT

A heater water valve has a servo actuator with a sub-fractional horsepower, low torque, high RPM motor operating on a 12 volt DC supply. A speed reducer provides rotation of an output sector gear. One travel limit position of the sector gear is provided by a resilient pad which is compressed by the sector gear to develop full motor stall torque in five degrees (5 degrees) of rotation of the sector gear, which rotates a shaft for opening and closing the heater water valve. The pad is preferably closed cell silicone foam.

11 Claims, 2 Drawing Sheets

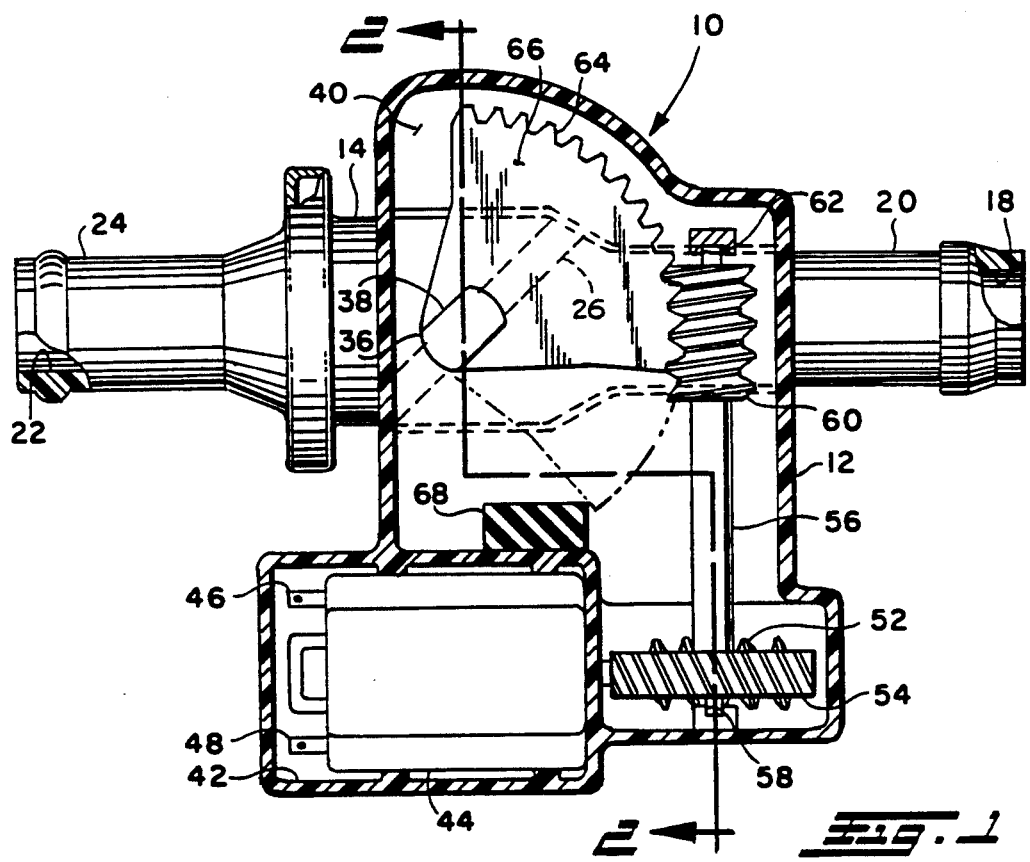
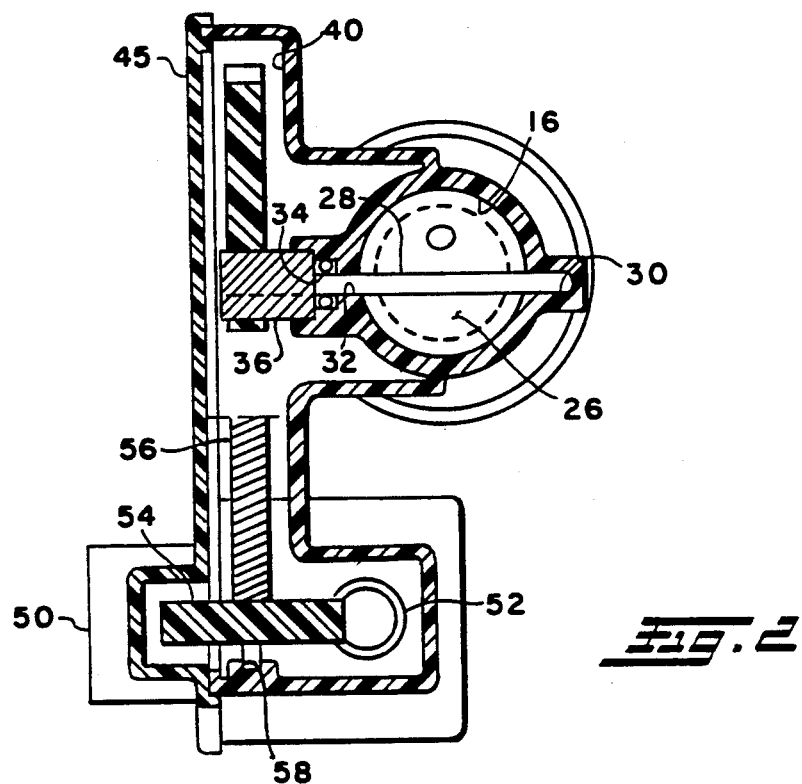

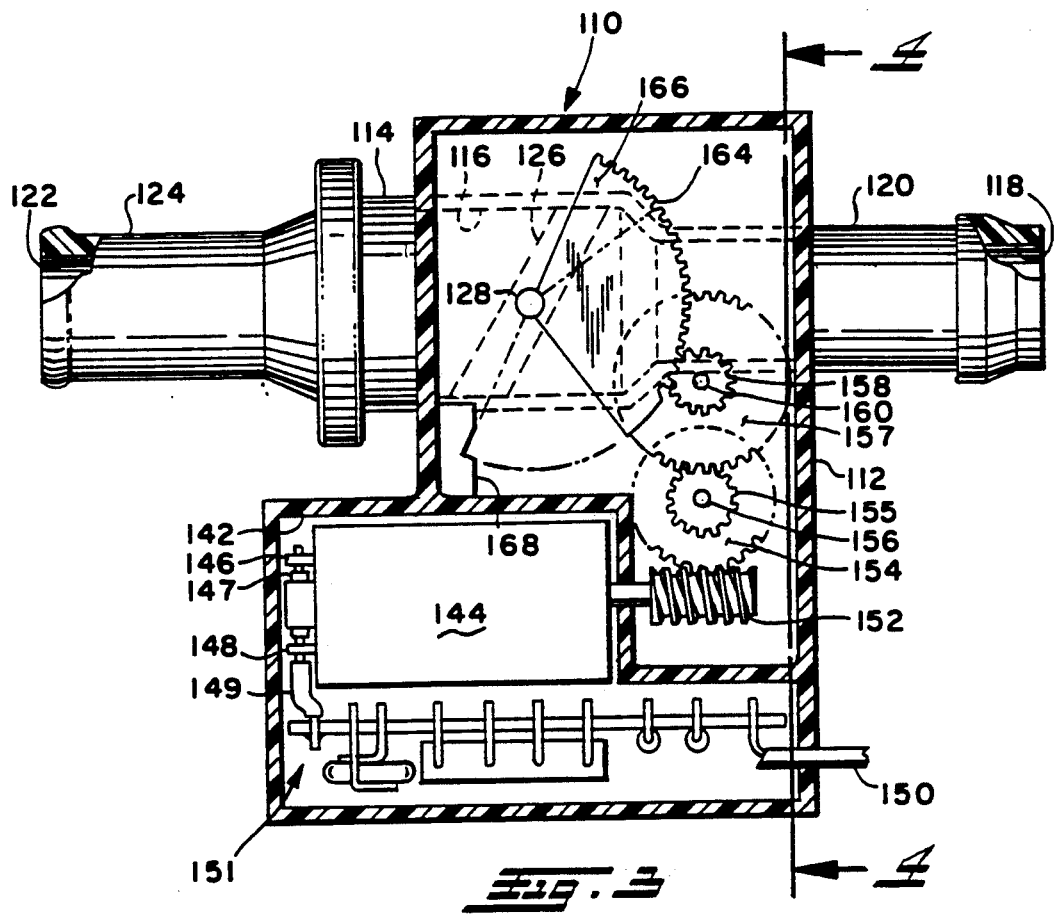
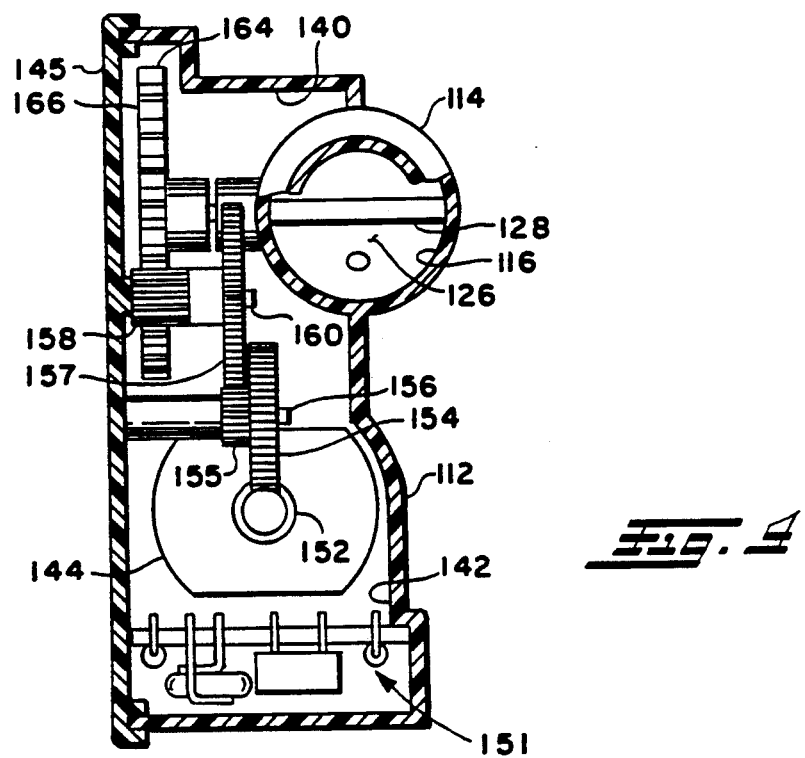

SERVO OPERATED VALVE ASSEMBLY

BACKGROUND OF THE INVENTION

The present invention relates to servo actuated valves and particularly to valves of the type employing a pivoted vane or butterfly plate and specifically to butterfly valves employed for controlling flow of water to a heat exchanger for a vehicle passenger compartment heating system. Heretofore, it has been common practice to employ a vacuum servo motor for opening and closing a butterfly water valve for usage with automotive passenger compartment heaters. Typically in such automotive applications the user operated a vacuum valve remote from the water valve to control vacuum applied to one side of a pressure responsive diaphragm actuator mounted on the water valve.

However, it has been desired in modern automotive heater control applications to provide for electrical control of the heater water valve in order to enable interfacing of the heater controls with the controls for the air conditioning system and other vehicular body accessories controlled by an on-board microcomputer. Where an electric motor driven servo actuator has been used for butterfly-type water valves, it has been found difficult to accurately sense the fully open position in order to cut off power to the motor at the desired limit position of the valve movement. One technique which has been employed is that of sensing motor stall current and switching off current to the motor when a predetermined level of current is sensed.

In automotive applications, the available vehicle on-board power is usually that of a 12 volt direct current source. Providing motor driven actuators for accessories operating on a 12 volt DC supply, has required that the motors be of a generally high rpm low current and torque variety in order to operate efficiently. Hence, it has been found necessary to employ a substantial speed reduction in the form of a high numerical ratio gear train to provide the necessary slow rate of rotation and high torque required to open and close the valve.

Where a high rpm electric motor has been employed with a numerically high ratio gear reduction for opening and closing a valve in an automotive heater application, it has been found that upon the valve reaching a limit stop for the open position, the rate of sudden deceleration of the high rpm motor and associated gearing creates torque spikes of high level and short duration associated with the inertial energy of the motor and gears. These torque spikes can damage and/or seize the motor actuator preventing proper operation.

Therefore, it has long been desired to find a way or means of providing an electric motor driven servo actuator operating on low voltage supply such as found in automotive application which could operate between travel limits resulting in motor stall and yet permit such operation without resultant damage to the motor drive.

SUMMARY OF THE INVENTION

The present invention provides an electrically operated motor driven servo actuator such as for use with a valve and particularly a butterfly valve employed for controlling flow to a heat exchanger for a vehicle passenger compartment. The servo actuator as employed in a driven valve assembly of the present invention employs a low torque high rpm motor driving a gear train for providing relatively low speed rotation of an output sector gear with sufficient torque to operate the valve.

The sector gear is drivingly attached to the external portion of a shaft extending through a wall of a flow passage having a movable valve member disposed therein and attached to the shaft for movement thereby. The sector gear, upon movement by the gear train, is operable to move the valve member between a closed position blocking flow through the passage and an open position permitting flow therethrough. The valve member typically comprises a vane or butterfly plate having a resilient elastomeric rim for closing against the walls of the flow passage. The opening movement of the valve member is limited by a resilient stop means which absorbs the full torque of the sector gear over a rotation of 5 degrees thereof sufficient to cause relatively slow motor stall which is electrically detectable to enable switching off of the motor current.

The energy absorbing resilient pad is preferably formed of elastomeric closed cell foam silicone material which has been found particularly suitable for automotive under hood environments.

BRIEF DESCRIPTION OF THE DRAWINGS

FIG. 1 is a plan view of the valve assembly of the present invention with the cover removed;

FIG. 2 is a section view taken along section-indicating lines 2—2 of FIG. 1;

FIG. 3 is a view similar to FIG. 1 of another embodiment of the invention; and

FIG. 4 is a section view taken along section-indicating lines 4—4 of FIG. 3.

DETAILED DESCRIPTION

Referring to FIGS. 1 and 2, the valve assembly indicated generally at 10 has a housing 12 which defines integrally formed therewith a portion 14 defining a fluid flow passage 16 therethrough which communicates with an inlet 22 provided in fitting 24 and an outlet passage 18 provided in fitting 20. The flow passage 16 has a movable valve member 26 disposed therein and attached to a shaft 28 which is journalled in a bearing 30 provided in one side of the flow passage. Shaft 28 extends through bearing aperture 32 provided in the opposite wall of the flow passage and exteriorly thereof. A suitable seal ring 34 is provided to seal about the shaft as it extends outwardly of the flow passage. The external end of shaft 28 has attached thereto a driving connector 36 which has driving surfaces provided thereon, as for example the flat surfaces 38.

In the presently preferred practice valve member 26 comprises a flat disc or butterfly plate having an elastomeric material provided about the periphery thereof to facilitate sealing in the closed position.

The housing 12 also defines a drive train cavity 40 which has a separate well portion 42 formed therein and a drive train cavity 40 is covered by a suitable cover plate 45 shown in FIG. 2, but which has been omitted in FIG. 1. A separate well portion 42 is formed in housing 12 and has received therein a suitable drive motor 44 which in the presently preferred practice is a subfractional horsepower motor operating at about 3,000 rpm no load on a 12 volt direct current supply. The motor 44 has electrical contact terminals 46, 48 adapted for electrical connection thereto through a connector 50 adapted for connection to a vehicle wiring harness.

Motor 44 has a worm 52 provided on the end of its shaft and which engages a worm driven gear 54 which is drivingly connected to shaft 56 which has one end thereof journalled in a bearing 58 provided in the housing. A worm 60 provided adjacent the opposite end of shaft 56 which is journalled in a second bearing 62 provided in the housing. Worm 60 engages teeth 64 of the output sector gear 66 which is drivingly connected to valve shaft 28 via flats 38.

In the embodiment of FIGS. 1 and 2, the sector gear 66 as shown in solid outline in the position of the extreme of its counterclockwise movement with shaft 38 rotated such that the valve 26 is in the closed position, which is shown in dashed outline in FIG. 1 and in solid outline in FIG. 2. In the present practice, for an automotive heater application, an overall gear reduction of 490:1 has been employed; and, adjacent meshing gears are formed, one of polyamide plastic and one of acetal plastic material. Upon energization of the motor 44 the gear train comprising gears 52, 54, 60, 66 moves the valve to the fully open position in which the sector gear 66 has the position shown in dashed outline in FIG. 1.

An energy absorbing stop means comprising resilient pad 68 is attached to the housing in the wall portion of cavity 40 adjacent the motor well 42. Stop means 68 is contacted by the sector gear 66 as it reaches the desired fully open position for the valve member 26. In the presently preferred practice, energy absorbing pad 68 is formed of a suitable closed cell elastomeric foam material such as a silicone foam; the material is capable of absorbing resilient deflection torque in the amount of 2.7–3.2 inch pounds ($3.05$–$3.6 \times 10^6$ dyn-centimeters) over a maximum of 10 degrees and preferably 5 degrees (5 degrees) of rotation of sector gear 66 causing a gradual reduction in motor rpm and has provided satisfactory operation to prevent prohibitively fast rise of torque on the gear train and prevent consequent damage thereto. In the presently preferred practice, the energy absorbing pad 68 is formed of a material having a compression deflection in the range 6–14 psi (41.4–96.6 KPa) as tested in accordance with ASTM Standard D1056. Although silicone foam material has been found particularly suitable, it will be understood that other materials having the desired energy absorbing characteristics may be employed.

In the present practice of the invention, the energy absorbing pad means 68 permits the motor torque to rise to the maximum stall level of about 55 gram centimeters for a small 3,000 rpm motor operating on a 12 volt direct current supply in approximately 6.8 revolutions of the motor shaft during the 5 degrees (5 degrees) of resiliently resisted rotation of the sector gear 66 as it moves against the surface of the energy absorbing means 68. This relatively slow rate of rise of torque on the motor produces a corresponding relatively slow rate of rise of current drawn by the motor as it approaches stall. Motor stall may be readily detected by electrical means well known in the art. The resilient energy absorbing pad means in the present invention thus enables the fully open position of the valve to be conveniently and readily determined by sensing motor stall current; and enables the motor speed to be gradually reduced thus preventing sudden rapid torque rise in the gear train which would otherwise result in damage to the gearing.

Referring now to FIGS. 3 and 4, another embodiment of the invention is illustrated, indicated generally at 110, as having a housing means 112 including integrally formed therewith a portion 114 defining a flow passage 116 therethrough which communicates with inlet passage 122 provided in inlet fitting 124 and outlet passage 118 provided in outlet fitting 120.

A movable valve member or plate in the form of a butterfly 126 is pivotally mounted in the flow passage 116; and, butterfly 126 is attached to shaft 128 which extends exteriorly of the body portion 114 and into a gear train cavity 140 formed in the housing.

The housing 112 has formed therein a separate motor well 142 which has received therein a drive motor 144 having electrical connector terminals 146, 148 which have connected thereto respectively electric leads 147, 149 which are attached to a printed circuit board indicated generally at 151 and which contain the electronic circuitry for control of the motor 144. The printed circuit board 151 receives electrical power through electrical lead, one of which is illustrated and indicated by reference numeral 150 in FIG. 3 which extend exteriorly through the wall of the housing 112 for external connection to the wiring harness in a vehicle.

In the presently preferred practice, the motor 144 is a subfractional horsepower motor capable of operating on a 12 volt direct current supply and has a no load shaft speed of 3,000 rpm. Motor 44 has a worm 152 provided on the end of its shaft which worm engages a worm driven gear 154 which has attached thereto a pinion 155 and both are journalled on a shaft 156 which is provided on the housing. Pinion 155 engages a second stage driven gear 157 which has attached thereto a pinion 158; and, the gear 157 and pinion 158 are journalled for rotation about a shaft 160 provided on the housing 112.

Pinion 158 engages the teeth 164 of a sector gear 166 which is drivingly attached to shaft 128 for rotating the shaft and moving the butterfly plate 126. The sector gear is shown in solid outline in FIG. 3 in a position of its extreme limit of counterclockwise rotation in which the butterfly plate 126 is in the closed position blocking flow through passage 116. The extreme limit of clockwise rotation of the sector gear 166 is shown in dashed outline in FIG. 3.

An energy absorbing pad means 168 is shown in FIG. 3 positioned to be contacted by the sector gear 166 as it reaches the extreme of its clockwise rotation for fully opening the valve. The material employed for the pad means 168 is similar to that of the embodiment of FIG. 1, as are the energy absorbing properties thereof. The gear train cavity is closed by a suitable cover plate 145 illustrated in FIG. 4. It will be understood that the operation of the servo driven valve of FIGS. 3 and 4 is similar to that of the embodiment of FIGS. 1 and 2.

The present invention thus provides a unique and novel electrically operated servo actuator as employed with a driven valve which has found particular application as a water inlet valve for automotive passenger compartment heaters and which employs a butterfly valve member pivoted in a flow passage for rotation between a fully open and fully closed position. The servo actuator uses a low torque high RPM low voltage motor driving a gear train having a sector gear as the final stage. The extreme limit of operation in one direction is associated with the fully open position of the valve The fully open position of the valve is determined by energy absorbing stop or pad means which is contacted by the final stage sector gear of the servo which is connected to the valve member and the energy absorbing pad means creates a gradual buildup of stall torque in the servo motor which permits detection of the stall position such as by sensing motor stall current and to permit the current to be cut off, and protects the drive train from excessive torque during motor stall.

Although the invention has hereinabove been described with respected to the illustrated embodiments, it will be understood that other embodiments are contemplated; and, the invention is limited only by the following claims:

I claim:
1. A servo driven valve assembly comprising:
   (a) a body means defining a flow passage therethrough communicating with a flow inlet and flow outlet;
   (b) valve means disposed in said flow passage and rotatably movable therein between a closed position preventing flow from said inlet to said outlet and an open position permitting flow between said inlet and said outlet, said valve means including shaft means extending exteriorly of said flow passage, said body means including stop means for limiting movement of said valve means;
   (c) motor driven means including actuator means connected to said shaft means, operable upon energization to move said valve means between said first and second positions; and,
   (d) retarding means formed of resilient material associated with said stop means and operable to retard the stall of said motor.

2. The valve assembly defined in claim 1, wherein said means operable to retard motor stall comprises a resilient member disposed on said body means for contact by said actuator means.

3. The valve assembly defined in claim 1, wherein said means operable to retard motor stall comprises a resilient member formed of a closed cell silicone foam material.

4. The valve assembly defined in claim 1, wherein said means operable to retard is capable of causing motor stall torque over five degrees (5 degrees) rotation of the torque shaft in one direction.

5. The valve assembly defined in claim 1, wherein said motor driven means includes speed reduction means.

6. The valve assembly defined in claim 1, wherein said motor driven means includes speed reduction means having an overall ratio of at least 490:1.

7. The valve assembly defined in claim 1, wherein adjacent meshing gear pairs are formed one of polyamide plastic and one of acetal plastic material.

8. The valve assembly defined in claim 1, wherein said means operable to retard motor stall includes a resilient elastomeric member having a compression deflection of G-14 PSI (41.4-96.6 KPa) as tested in accordance with ASJM Std. D1056.

9. The valve assembly defined in claim 1, wherein said motor means includes a motor capable of operating on a 12 volt direct current supply and has a stall torque of about 55 gm om.

10. The valve assembly defined in claim 1, wherein said motor means includes a motor worm and worm driven gear.

11. The valve assembly defined in claim 1, wherein said motor means includes an output shaft connected to move said valve member and said means operable to retard motor stall includes an elastomeric member capable of absorbing torque in the range 2.7-3.2 in lbs (3.05-3.6×$10^6$ Dyne-Centimeters) over five degrees (5 degrees) of rotation of said output shaft.

* * * * *